United States Patent [19]
Nielsen

[11] Patent Number: 5,907,680
[45] Date of Patent: May 25, 1999

[54] CLIENT-SIDE, SERVER-SIDE AND COLLABORATIVE SPELL CHECK OF URL'S

[75] Inventor: Jakob Nielsen, Atherton, Calif.

[73] Assignee: Sun Microsystems, Inc., Palo Alto, Calif.

[21] Appl. No.: 08/668,877

[22] Filed: Jun. 24, 1996

[51] Int. Cl.[6] .................................................. H04L 12/00
[52] U.S. Cl. ............................... 395/200.58; 395/200.75; 707/533
[58] Field of Search ........................ 395/200.57, 200.58, 395/200.59, 200.47, 200.48, 200.49, 200.75; 707/533, 5; 345/336, 338

[56] References Cited

U.S. PATENT DOCUMENTS

| | | | |
|---|---|---|---|
| 5,203,705 | 4/1993 | Hardy et al. | 707/533 |
| 5,218,536 | 6/1993 | McWherter | 707/533 |
| 5,261,112 | 11/1993 | Futatsugi et al. | 707/533 |
| 5,572,423 | 11/1996 | Church | 707/533 |
| 5,708,780 | 1/1998 | Levergood et al. | 395/200.12 |
| 5,774,664 | 6/1998 | Hidary et al. | 395/200.48 |
| 5,778,181 | 7/1998 | Hidary et al. | 395/200.48 |

OTHER PUBLICATIONS

Cover sheet for Brown, "Special Edition Using Netscape 2" published by Que, 1995.
Using Netscape 2.0, Mark R. Brown, published by Que Corporation, pp. 182–207, May 8, 1996.

*Primary Examiner*—Frank J. Asta
*Assistant Examiner*—Daniel Patru
*Attorney, Agent, or Firm*—McDermott, Will & Emery

[57] ABSTRACT

Spell checking of network addresses such as Uniform Resource Locator (URL) addresses is provided at three levels. Each is invoked when a connection to the specified network address is unable to be established. At a client level, the specified URL is compared with URL's previously successfully used to find candidate misspellings. At a server level, directory and file names are checked against corresponding components of the URL to which connection was requested to return a list of candidate correct spellings to the requestor. Excluded from the list returned to the requestor are the correct spellings of "hidden" files to which general access is not desired. At a network access provider level, information about URL's successfully used by all customers is accumulated and used to provide a candidate list of correct spellings to a user. Older entries are periodically pruned from the database to control size.

19 Claims, 17 Drawing Sheets

| SERVER NAME | DATE ACCESSED |
|---|---|
| www.sun.com | 1-1-96 |
| www.netscape.com | 2-10-96 |
| www.nsf.org | 1-22-96 |
| ⋮ | ⋮ |

Figure 14A

| URL | DATE ACCESSED |
|---|---|
| www.company.com/foo/bat/filr.html | 1-10-96 |
| www.nasa.gov/pictures/earth/northpole.gif | 1-21-96 |
| ⋮ | ⋮ |

Figure 14B

CLIENT-SIDE, SERVER-SIDE AND COLLABORATIVE SPELL CHECK OF URL'S

BACKGROUND OF THE INVENTION

1. Field of the Invention

The invention relates to computer communications systems and more particularly to spell checking of resource identifications in a network environment.

2. Description of Related Art

In order to access specific World-Wide-Web (WWW) pages, users must often enter the Uniform Resource Locator (URL) which provides the address of the page on a remote server. However, as WWW browsers evolved, the focus of the user interface has been to allow users to access remote pages by selecting hypertext links, thus often removing the need to manually enter URLs. Scant attention has been paid to the problems inherent in manual URL entry. Yet, the explosive growth of the WWW has made it inconvenient to follow a long series of hypertext links to retrieve a page desired by the user: in fact, companies, organizations and individuals often provide their URLs in television advertisements, on printed materials, and verbally. This has led to a growing number of instances when the user would prefer to directly enter the URL in the browser.

A major problem with the manual entry of URLs is the introduction of spelling errors, which are particularly common because of the characteristics of URL syntax and structure. Often long, the URL often includes terms, such as "http", "com", "org", "gif", "jpeg", that are not commonly known by users. URLs may also be in a foreign language, especially for those users in non-English speaking countries. Additionally, the URL may include odd special characters such as ~, ^, and @ that are difficult to type and hard to remember. The fact the URLs interpret upper and lower case letters differently is yet another source of user input error. Finally, the user is often relying on a quickly made note or just his memory from a brief appearance of a URL or from a spoken URL in an advertisement. All of these factors taken together provide a rich basis for the introduction of spelling errors during manual entry of URLs.

In order to assist the user with manual URL entry a spelling checker is needed. Spell checking in general is well established in the art, with numerous different implementation schemes. The central idea of a spelling checker is to take the word in question and compare it to a dictionary of legal spellings to find one or more words that are spelled roughly the same way and to then provide the user the ability to chose the correct word from a list presented by the spelling checking program.

However, traditional spelling checkers, using the prior art, are unsuitable for use in the WWW environment for several reasons. The dynamic nature of the WWW, where new URLs are constantly being created, precludes the use of a static dictionary. The sheer number of URLs precludes the use of a dynamic dictionary: as of April 1996 there were more than 30 million URLs on the WWW. Additionally, since the WWW operates in a client-server environment, only the server knows what URLs are valid for accessing WWW pages residing on that server. Servers often contain files (pages) that are not intended for general use and the server administrators rely on the fact that only users who know the exact URLs can retrieve those files. The introduction of sophisticated spelling checkers for URLs must take this fact into account. Finally, the prior art provides no mechanism for utilizing knowledge obtained from other users, behavior.

As an example of the prior art, Netscape's Navigator WWW browser performs a simplistic spelling check on manually entered URLs. Specifically, the program tries to identify and correct problems with the protocol and server names. The program will try adding "http://" to the URL if no protocol is specified, it will also add "www." before and ".com" after the domain name if they are not present in the manually entered URL. These spelling check capabilities are simple but helpful, but are not sufficiently robust or extensive to solve the general problem of spelling errors in manually entered URLs.

SUMMARY OF THE INVENTION

The present system provides apparatus, systems, processes and software which provide a user who manually enters a URL with a sophisticated method for spell checking the URL to increase the probability of finding the desired WWW in a timely fashion.

The invention is composed of three components that may work in concert, individually or in pairs. The client-side component operates in conjunction with the user's browser running on the user's computing device. The server-side component operates on the server computing device which contains the WWW pages the user wishes to acquire and communicates with the user by dynamically constructing one or more WWW pages containing alternative spellings for the URL (as hypertext) and sending the constructed page(s) to the user's browser for display. The collaborative component operates on Internet Service Providers (ISPs) servers, or on an organization's proxy server to maintain the protection of whatever firewalls are in place. It communicates to the user in a manner similar to that of the server-side component. The collaborative component of the invention utilizes knowledge from other users' behavior (i.e. the WWW pages they have successfully retrieved in the past by all users) to provide a knowledge base for the spelling checker.

The three components (client-side, server-side and collaborative) represent three unique but complementary methods of providing spelling check services to the user. Each component resides on a different part of the WWW and addresses the spelling check problem differently. The multi-platform and dynamic nature of the WWW suggests that a user cannot be assured that all three components are always available, but the invention is robust enough to utilize only those components that are present. In fact, the components are not coupled at all but yet are able to work together by using the common language of the WWW, namely Hyper-Text Markup Language (HTLM), which provides a universal way of encoding information that any compliant browser can display to the user.

The novel features of this invention are inter alia its sophisticated spelling check functionality, its dynamic nature, and its ability to leverage the experiences of multiple users to a knowledge base that will assist all future users.

The invention relates to apparatus for checking spelling of network addresses, including a database containing valid network protocol names, a database containing valid network server names, a database containing valid component names, and a computer configured to analyze a network address, used in an attempt to establish a connection to that address but which did not result in a connection, to compare portions of that address with a database containing corresponding information and present to a user one or more alternative spellings of that address if a portion of that address does not match identically a valid entry in the database.

The invention also relates to apparatus for checking spelling of network addresses received at a server having a hierarchical directory structure from a remote user, including a database containing names of hidden files, and a computer configured to analyze network addresses term by term beyond the server address, to compare portions of an address with corresponding portions of the server directory and to present to the remote user one or more alternative spellings if a directory or file name does not match identically a valid entry in the hierarchical directory, unless such an alternative spelling is contained in the database.

The invention also relates to apparatus for checking spelling of network addresses received from a remote user at a network access provider, including a database containing remote server names to which users have successfully connected, a database containing network addresses, and a computer configured to analyze a network addresses, received from a remote user which did not result in a connection, to compare portions of that address with portions of each database containing corresponding information and present to a user one or more alternative spellings if a portion of a network address does not identically match a valid entry in the databases.

In each of the apparatus described, the one or more alternative spellings are presented in a form, such as HTML, so that the remote user can select one of the alternative spellings with an input device, such as a mouse, and attempt to connect again using the selected alternative spelling.

The invention is also directed to a system for checking spelling of network addresses received from a user, including at least any two of a client spell checker, a network access provider spell checker and a server spell checker, resident on respective computers connected to the network.

The invention is also directed to a system for checking spelling of network addresses received from a user, including a network, and a computer connected to the network configured to spell check network addresses and to suggest alternative spellings. The computer can be either a computer is operated as a client in a client-server mode, one operated as a server in a client-server mode or one operated as a network access provider.

The invention is also directed to a method of checking spelling of network addresses, by comparing a portion of a network address received from a user which did not result in a connection with entries in a database containing corresponding portions of network addresses which had previously resulted in connections, identifying candidate matches from the database which match imperfectly a portion of a network address, and when one or more candidate matches is found, providing a list of the candidate matches to the user. Candidate matches are provided to a user in a hypertext format.

The invention is also directed to a method of checking spelling of network addresses in a server having a hierarchical directory, by comparing a portion of a network address received from a remote user which did not result in access to a document on the server with corresponding portions of the hierarchical directory, and presenting to the remote user alternative spellings if a directory or file name does not match identically a valid entry in the hierarchical directory. Hidden files are excluded from the list of alternative spellings presented to a user.

The invention is also directed to a method of checking spelling of network addresses at a network access provider, by storing remote server names and network addresses, to which network access provider users have successfully connected, in one or more databases, comparing portions of an address received from a network access provider user which did not result in a connection, with corresponding portions of the database, and presenting to the network access provider user alternative spellings if a portion of an address does not identically match a valid entry in the database.

The invention is also directed to computer program products carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The object, features, and advantages of the system of the present invention will be apparent from the following description, in which

FIGS. 14A and 14B illustrates exemplary databases used with the collaborative component of the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noteall of these hat all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
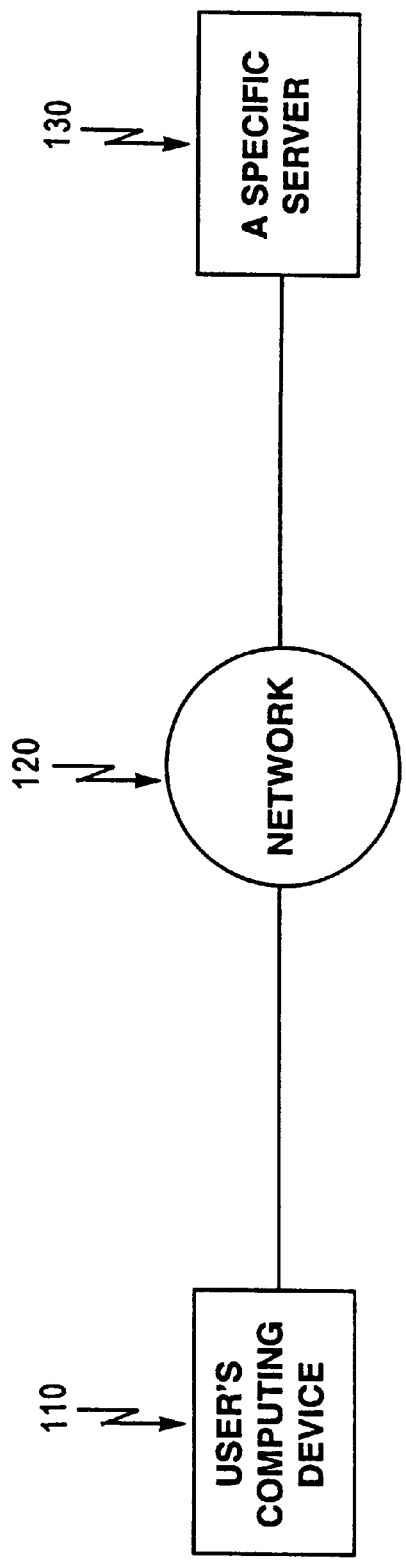
FIGS. 1A and 1B illustrates environments in which the invention operates.
Figure 1B:
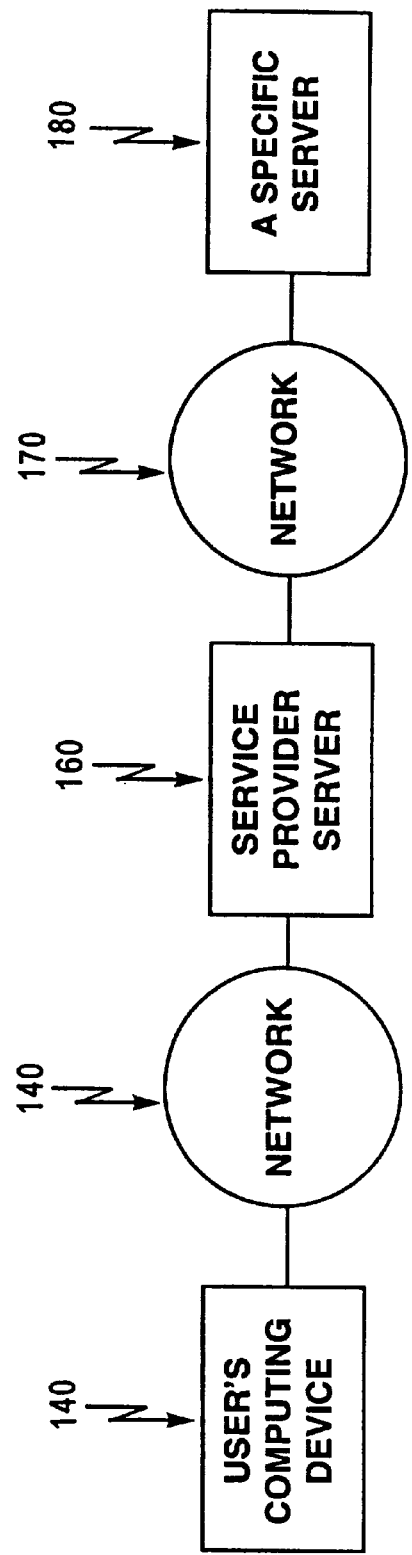

The environment in which the invention will operate is illustrated in FIGS. 1A and 1B. In the simplest environment, shown in FIG. 1A the user's computing device (110), running WWW browser software, is attached to a network (120). The specific WWW server (130) the user wants to access is attached to the same network. A more complex environment is depicted in FIG. 1B in which the user's computing device (140) is attached to a network (150) that is attached to a Internet Service Provider (ISP) server (160) which is, in turn, connected to another network (170) providing a connection to the specific WWW server (180). The various components of the invention may or may not be installed at each computing device or server, but the client-side component could be installed on the user's computing device (110, 140), the server-side component could be installed on the specific WWW server being accessed (130, 180) and the collaborative component could be installed on the ISP server (160).

FIGS. 2 through 9 provide flowcharts and diagrams to demonstrate the preferred embodiment of the client-side component of the invention.

Figure 2:
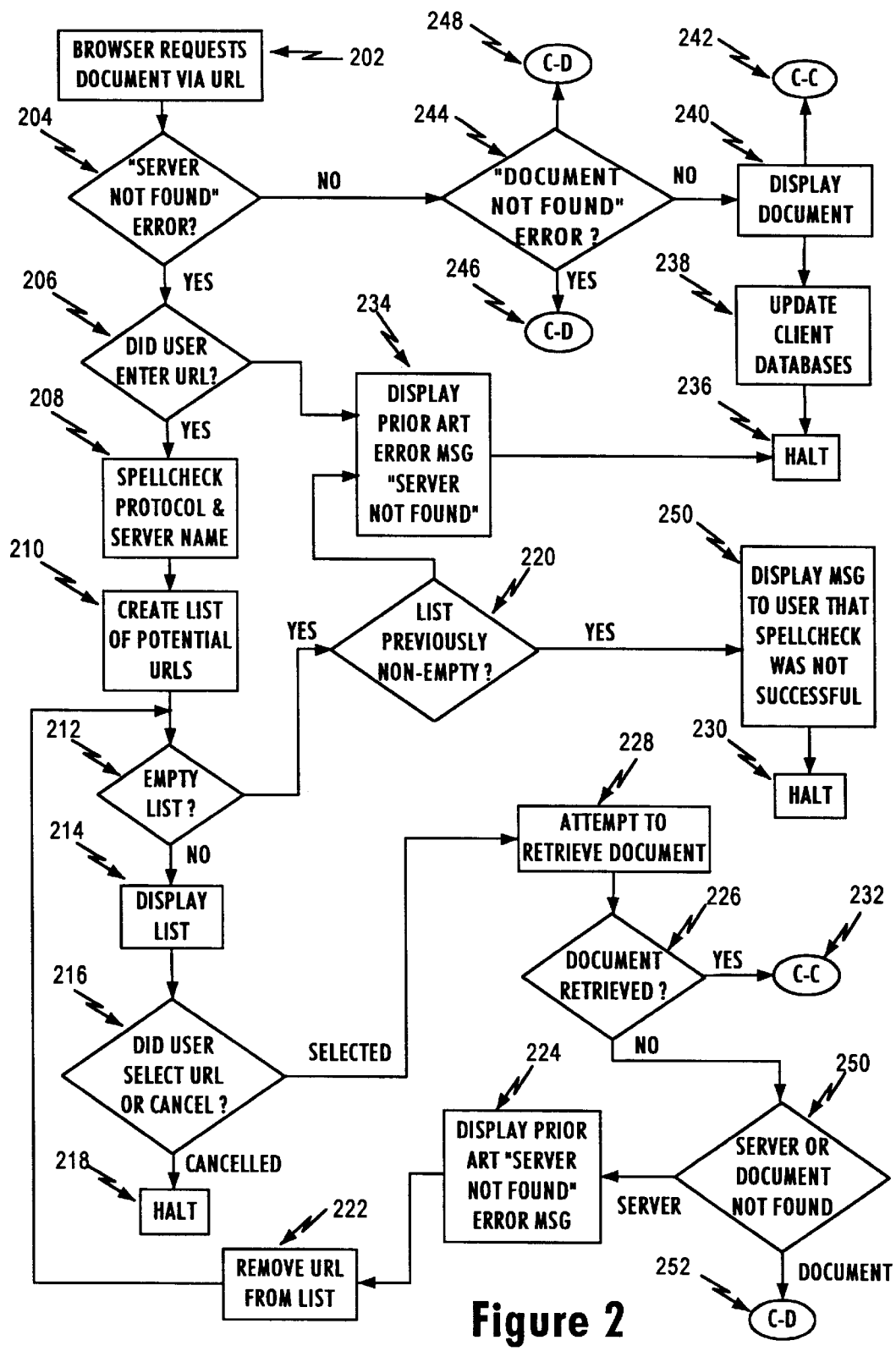
FIGS. 2 and 3 together are a flowchart for the client-side process in accordance with the invention.

FIG. 2 provides a flowchart for the operation of the client-side portion of the invention and makes no assumptions regarding the deployment of the other components of the invention. The process begins when the browser sends a request for a particular WWW document or page (202). If the browser does not receive a "Server Not Found" error (204) and it does not receive and "Document Not Found" error (244) then the document is displayed by the browser (240), the client-side component's databases are updated (238 and FIGS. 8 and 9), and the process is terminated (236).

If, however, the browser receives a "Server Not Found" error (204) and the URL was not entered by the user (206, i.e., the user attempted to access the URL via a hypertext link), then the standard "Server Not Found" error message is displayed by the browser (234) and the process is terminated (236). Alternatively, if the URL was manually entered by the user (206) then the client side component of the invention performs a spelling check on the protocol and domain-name portion of the URL (208) and creates a list of potentially valid URLs (210). If the created list is not empty (212) then the list is displayed to the user in a hypertext format (214). The user may then select one of the generated URLs (216) or cancel the operation (216). If the user chooses to cancel the operation (216) then the process is terminated (218). If, however, the user chooses one of the URLs displayed (216) then an attempt is made to retrieve the desired document (228). If it is successfully retrieved (226) then, following the flowchart connector (232) to its entry point (242), the document is displayed by the browser (240), the client-side component's databases are updated (238) and the process is terminated (236). If the document in not successfully retrieved then the type of error encountered is evaluated (250). If the error was "Server Not Found" then that message is displayed using the prior art (224), the invalid URL is removed from the list (222) and, if the list is not empty (212) the process repeats from (214) until either the list is empty (212), in which case the process is terminated as described below, or a valid URL is selected (216) and used to retrieve the document with processing continuing at the C-C entry point (242). If the error was "Document Not Found" then, following the connector C-D (252) to its input at (248) where spell check operations on the URL components begins.

If, however, the created list is empty (212) and has never had any URLs contained within it (220), then the "Server Not Found" error message is displayed using the prior art (234) and the process is terminated (236). Alternatively, if the list is now empty (212) but previously held URLs (220) then the user is provided with a message stating that the spelling check operation did not yield any valid URLs (250) and the process is terminated (230).

Figure 3:
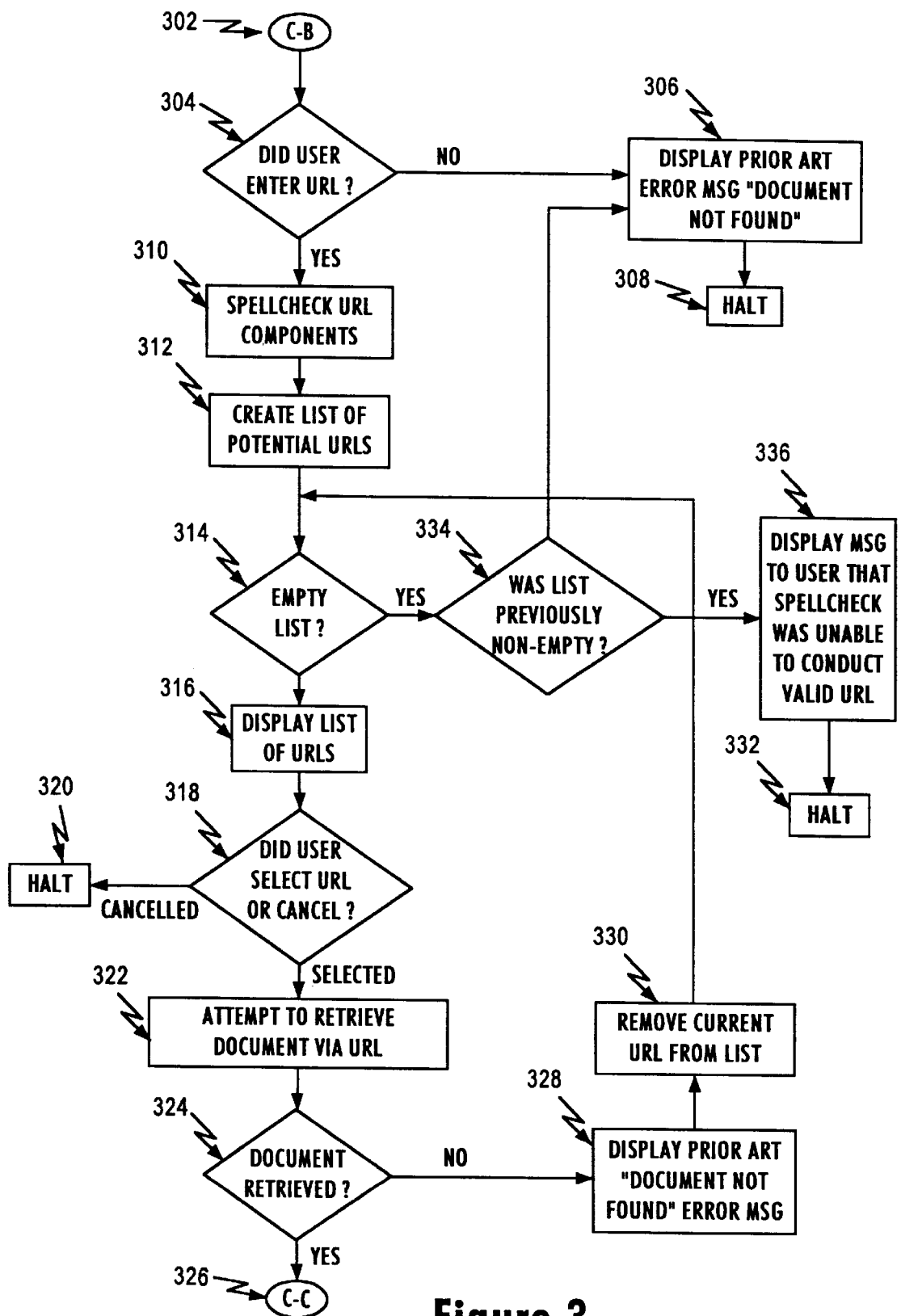

A URL that does not return a "Server Not Found" error (204) but does return a "Document Not Found" error (244) follows the connector (246) to FIG. 3's connector input (302). If the user did not manually enter the URL (304) then the error message "Document Not Found" is displayed using the prior art (306) and the process is terminated (308). Otherwise, the user did manually enter the URL (304) and the components (i.e. those atomic words to the left of the domain name but ignoring Common Gateway Interface (CGI) arguments; for example in the URL "http://www.company.com/foo/bar/doc.html?argument" the components are defined to be foo, bar, and doc.html) are then spell checked (310) and a list of potential URLs is generated (312). If the list is not empty (314) then the list of URLs is displayed to the user in a hypertext format (316) where the user can either select one of the URLs or cancel (318). Choosing cancel (318) will terminate the process (320). Selecting a URL from the list (318) results in an attempt to retrieve the document using the selected URL (322). If the document is successfully retrieved (324) then processing branches from the connector C—C (326) to the input connector C—C (FIG. 2, 242) where the document is displayed (FIG. 2, 240), the client-side component's databases are updated (FIG. 2, 238) and the process is terminated (FIG. 2, 236).

If the selected URL is insufficient to retrieve a document (324) then, using the prior art, the "Document Not Found" error message is displayed (328), the invalid URL is removed from the list (330) and processing resumes at (314), continuing until a document is retrieved, the user cancels the operation or the list becomes empty. If the list becomes empty (314) and the list previously held constructed URLs (324) then the user is given a message stating that none of the constructed URLs were valid (336) and the process is terminated (332).

Should the list of potentially valid URLs be empty (314, 334) immediately after the spell check (310) and list creation process (320) then the "Document Not Found" error message will be displayed using the prior art (306) and the process terminated (308).

FIGS. 4–7 are a detailed view of the processes described in FIG. 3 and labeled "spell check URL components" (310) and "create list of potential URLs" (312). The spell checking process detailed in FIGS. 4–7, although specifically in the context of the client-side component of the invention, works with minor and obvious modifications all the components where two text strings are compared. The generic algorithm is given below. Assume that one of String 1 and String 2 is the version typed in by the user. The other will normally be a version stored in the database.

1) A potential spelling check match between two text strings, String1 and String2, is detailed as follows:

Phase I: The process temporarily removes each of the characters in String1 the temporarily modified String1 is identical to String2 then a potential match exists.

Phase II: The process temporarily removes each of the characters in String2 and if the temporarily modified String2 is identical to String1 then a potential match exists.

Phase III: Both String1 and String2 are temporarily converted into lower-case and all non-alphanumeric characters are removed. If String1 and String2 are identical then a potential match exists.

Figure 4:
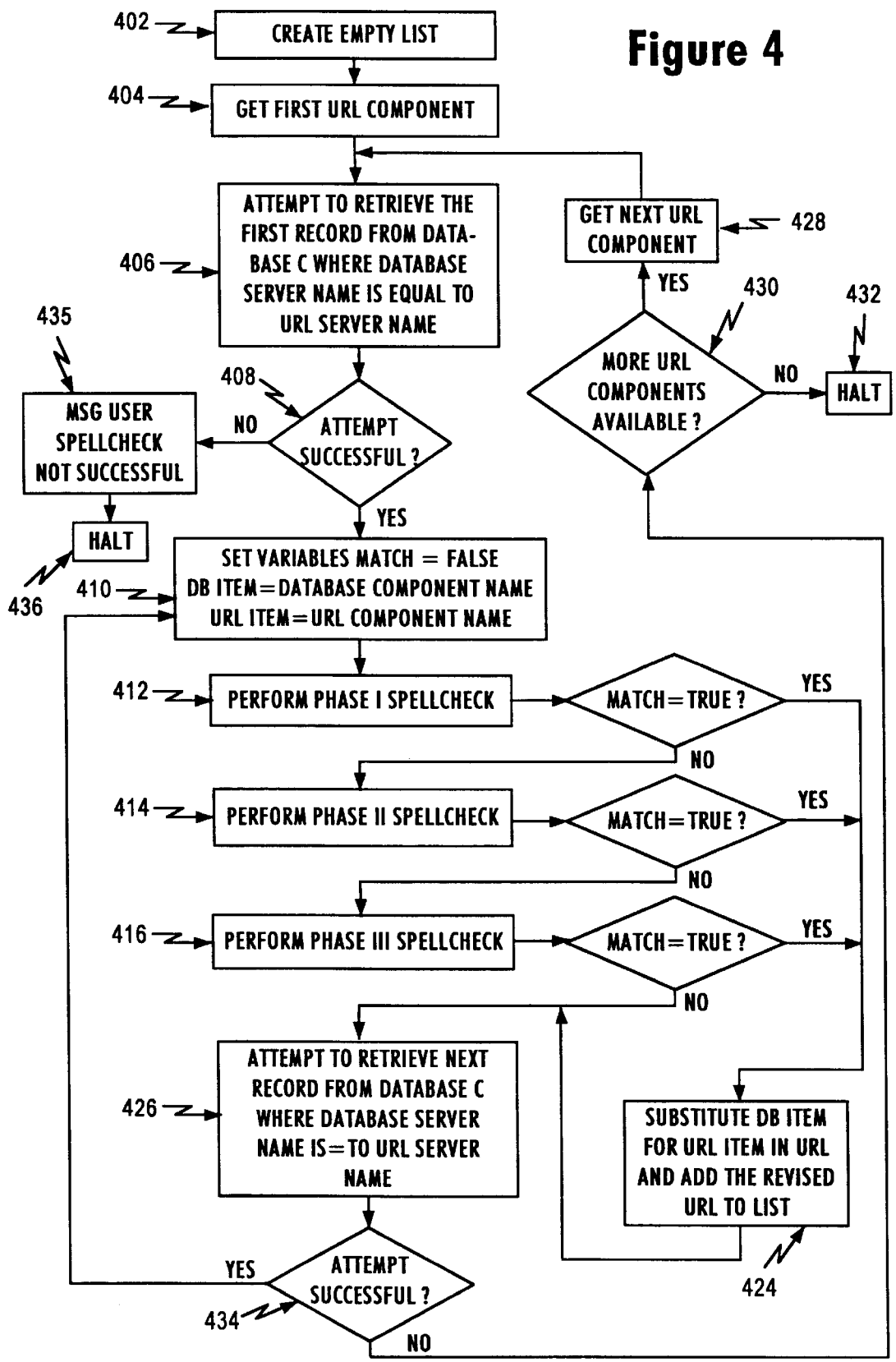
FIG. 4 is a flowchart for a client-side spelling checker in accordance with the invention.

FIG. 4 is the process flowchart for the spelling checker operation of the client-side component of the invention. Upon invocation, an empty list is created (402) and the first URL component (as defined above) is parsed from the complete URL (404). An attempt is then made to retrieve a tuple {server name, component name} from Database C (see FIG. 8, item 840) where the server name from the URL matches the server name in Database C (406). If the attempt is not successful (408) then Database C contains no matching entries to the URL's server name and the spell check process cannot proceed. The user is given a message (435) that the spell check process was unsuccessful (435) and the process is halted (436).

Alternatively, if the attempt was successful (408) then the variables String1 and String2, the URL component and the retrieved Database component respectively, are assigned to temporary variables and the match indicator is set to FALSE (410). Then Phase I (412) of the spelling check algorithm, as defined above, is invoked. If a match was found, the match indicator will have a value of TRUE. If the match indicator is still false after Phase I is completed, Phase II (414) is invoked. Similarly, if Phase II does not result in a match, then Phase III (416) is invoked. If Phase III also does not yield a match then an attempt is made to retrieve the next tuple from Database C where the server name equals the URL server name (426). If the attempt is successful (434) then the temporary variables are reset in (410) and the process begins again at (412).

Should any Phase result in the match indicator being set to TRUE (418, 420 and 422) then the Database component that matched the URL component replaces the URL component in the URL and the revised URL is added to the list of potentially valid URLs (424). An attempt is then made to retrieve another tuple from the database (426) and if the attempt is successful (434) then the temporary variables are reset in (410) and the process begins again at (412).

When the attempt to get the next tuple from Database C fails because the server name does not match that of the URL (434) (i.e. all tuples with server name equal to the URL server name have been examined) then, if there are more URL components to process (430), the next component is parsed from the URL (428) and the process begins again at (406). If there are no more URL components (430) then the process halts (432), returning the list of potentially valid URLs to be tested in FIG. 3, item 314.

Figure 5:
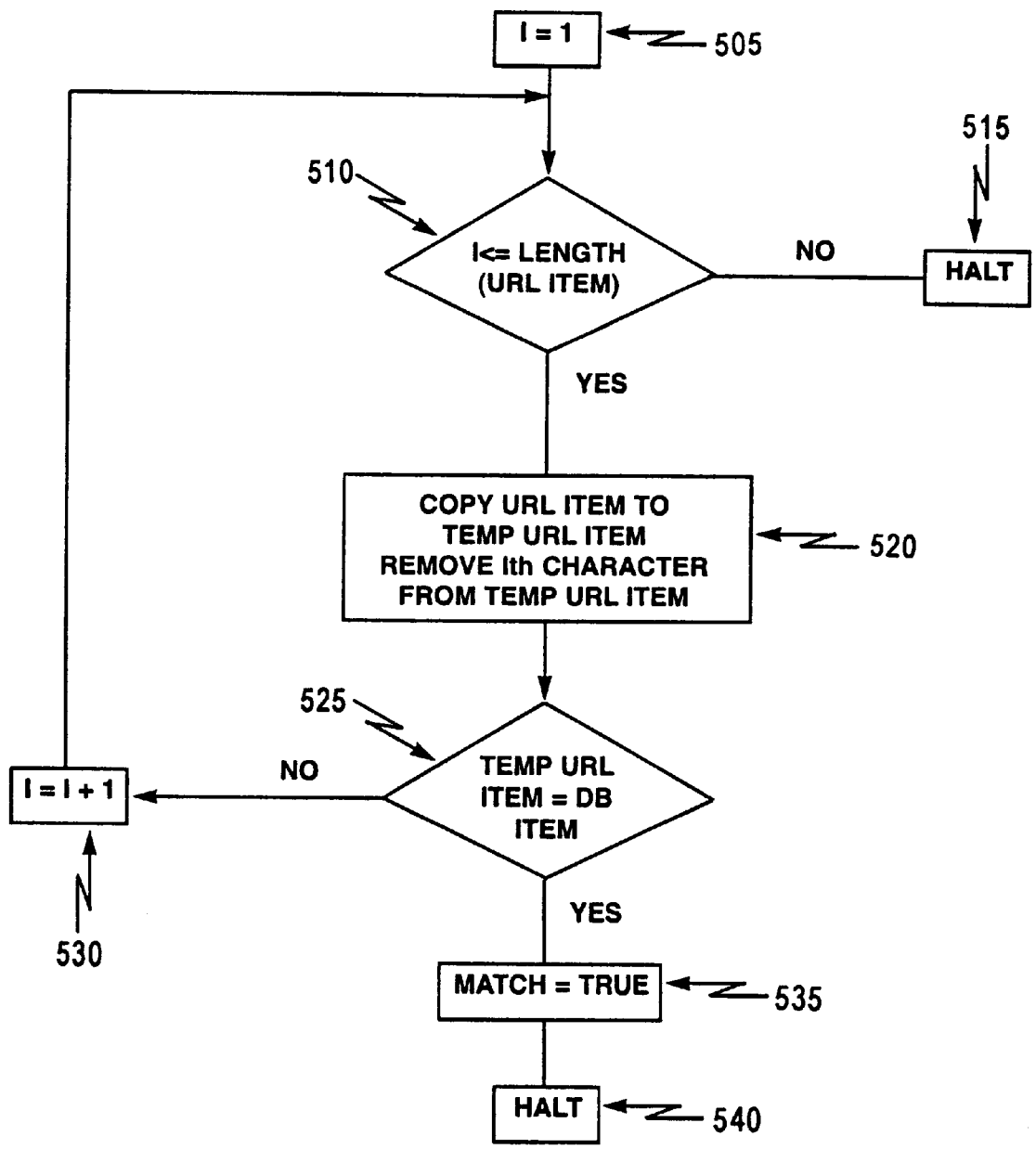
FIG. 5 is a flowchart of a Phase I routine used with the client-side spelling checker of FIG. 4.

FIG. 5 provides a detailed process flowchart of the Phase I spelling check for the client-side component of the invention. In Phase I, the value for String1 is the URL component and the value for String2 is the component found in the Database C. Initializing a counter (505) allows the process to sequentially (510) and temporarily remove a single character at a time from String1 and place the result in a temporary variable (520). If the temporary variable equals String2 (525) then the match indicator is set to TRUE (535) and the process is terminated (540). If the two strings are not equal (525) then the counter in incremented to point to the next character in String1 (530) and the process begins again at (510). If the counter is greater than the length of String1 then no match has been found and the process is terminated (515).

Figure 6:
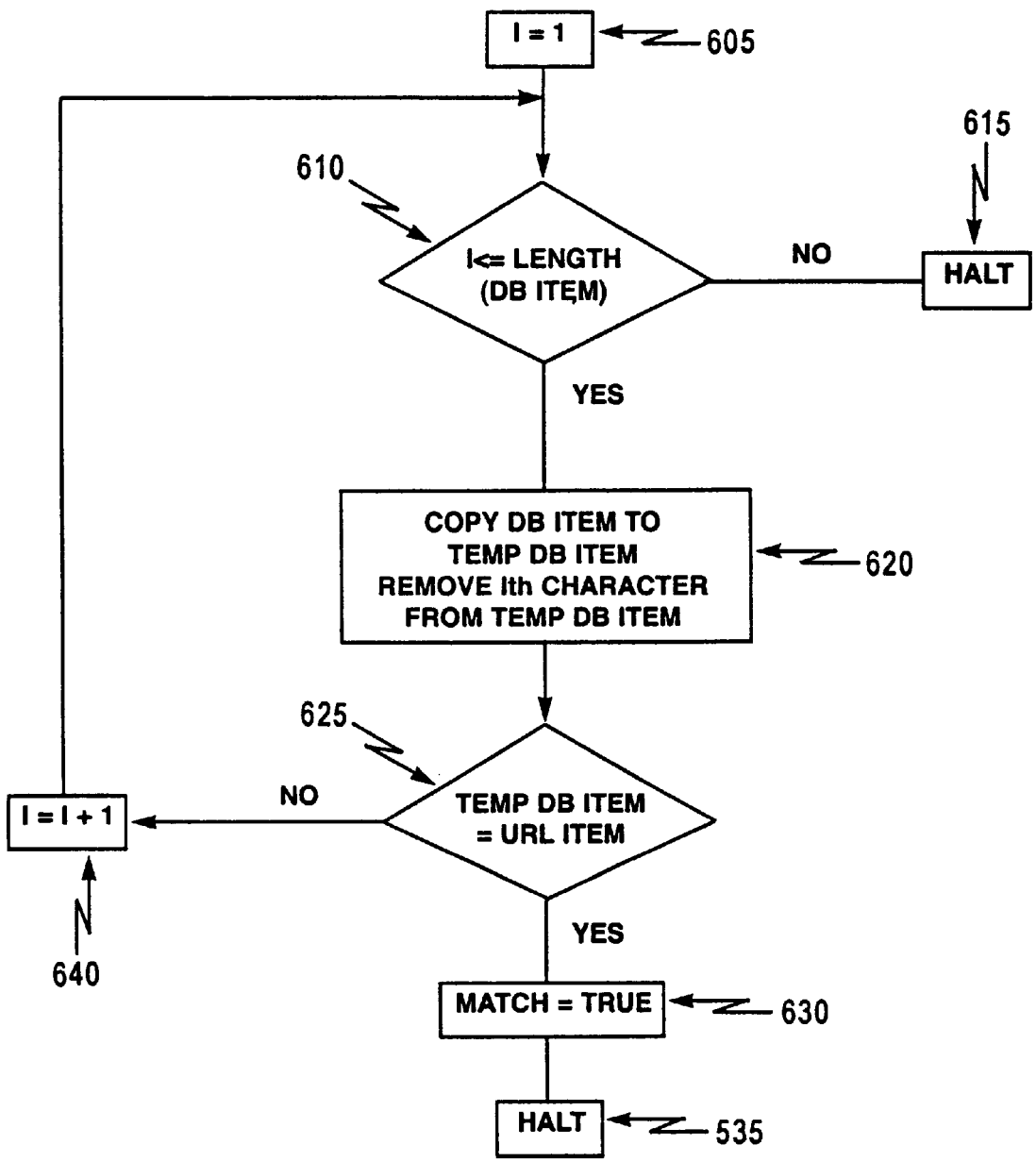
FIG. 6 provides a detailed flowchart for Phase II of the client-side spelling checker of FIG. 4.

FIG. 6 provides a detailed process flowchart of the Phase II spelling check for the client-side component of the invention. In Phase II, the value for String2 is the URL component and the value for String1 is the component found in the Database C. Initializing a counter (605) allows the process to sequentially (610) and temporarily remove a single character at a time from String1 and place the result in a temporary variable (620). If the temporary variable equals String2 (625) then the match indicator is set to TRUE (630) and the process is terminated (635). If the two strings are not equal (630) then the counter in incremented to point to the next character in String1 (640) and the process begins again at (610). If the counter is greater than the length of String1 then no match has been found and the process is terminated (615).

Figure 7:
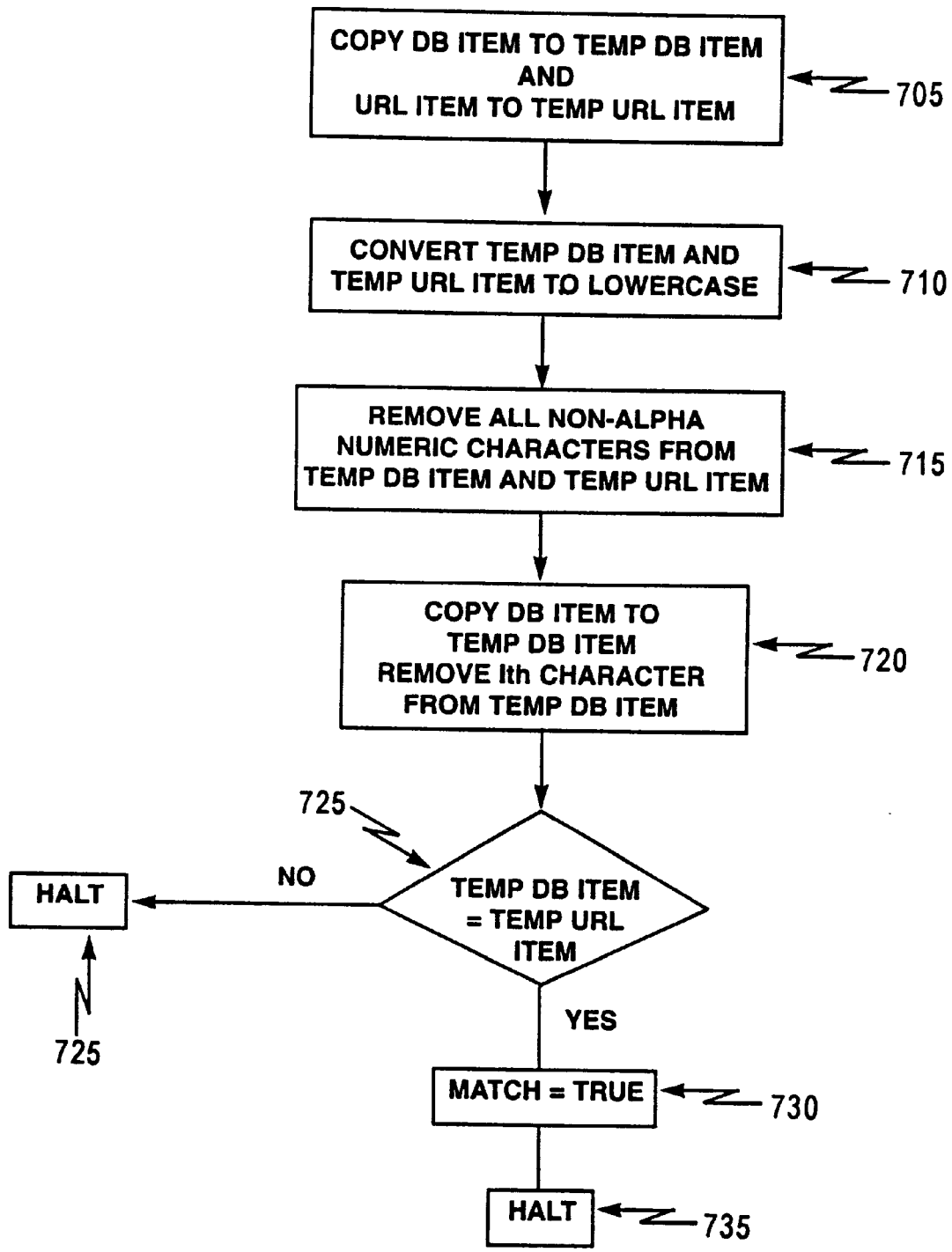
FIG. 7 provides a detailed flowchart for Phase III of the client-side spelling checker of FIG. 4.

FIG. 7 provides a detailed process flowchart of the Phase III spelling check for the client-side component of the invention. In Phase III, the value for String1 is the URL component and the value for String2 is the component found in the Database C. Each string variable is copied into a temporary variable for processing purposes (705), and the temporary variables are then converted to lower case (710) and then all non-alphanumeric characters are removed from both (715). If the temporary variables are equal (720) then the match indicator is set to TRUE (730) and the process is terminated (735). If the two strings are not equal (720) then the process is terminated (725).

Figure 8A:
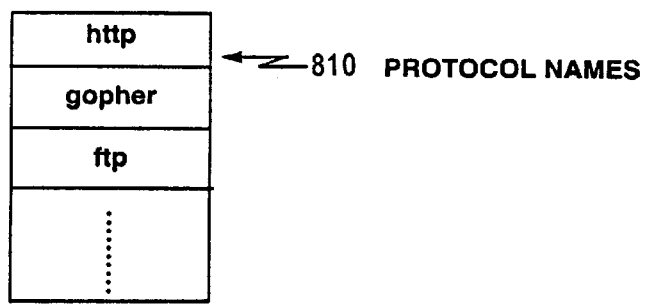
FIGS. 8A, 8B and 8C illustrate content of databases used by the client-side component of the invention.
Figure 8B:
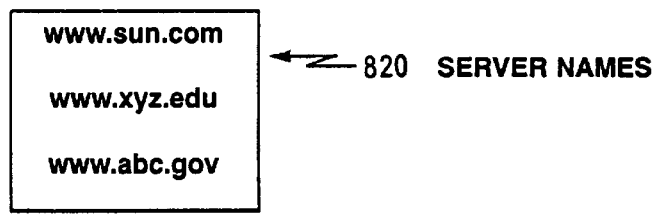
Figure 8C:
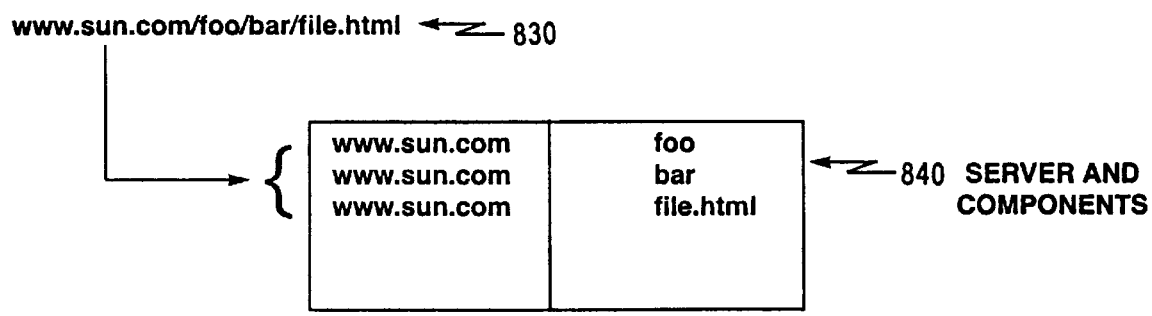

FIGS. 8A–8C illustrate the databases required by the client-side component of the invention. The database of FIG.

8A (810) is a simple list of WWW protocols that would only be changed when the browser itself supported additional protocols. The database of FIG. 8B (820) is also a simple list, but it is updated dynamically with the server names of all URLs that have been successfully accessed and viewed. The complete and correct URL (830) is used as input data for the database of FIG. 8C (840) which contains tuples composed of {server name, component name} as discussed above and which is also updated dynamically. As shown in FIG. 8C, a plurality of {server name, component name} may be generated from a single URL.

Figure 9:
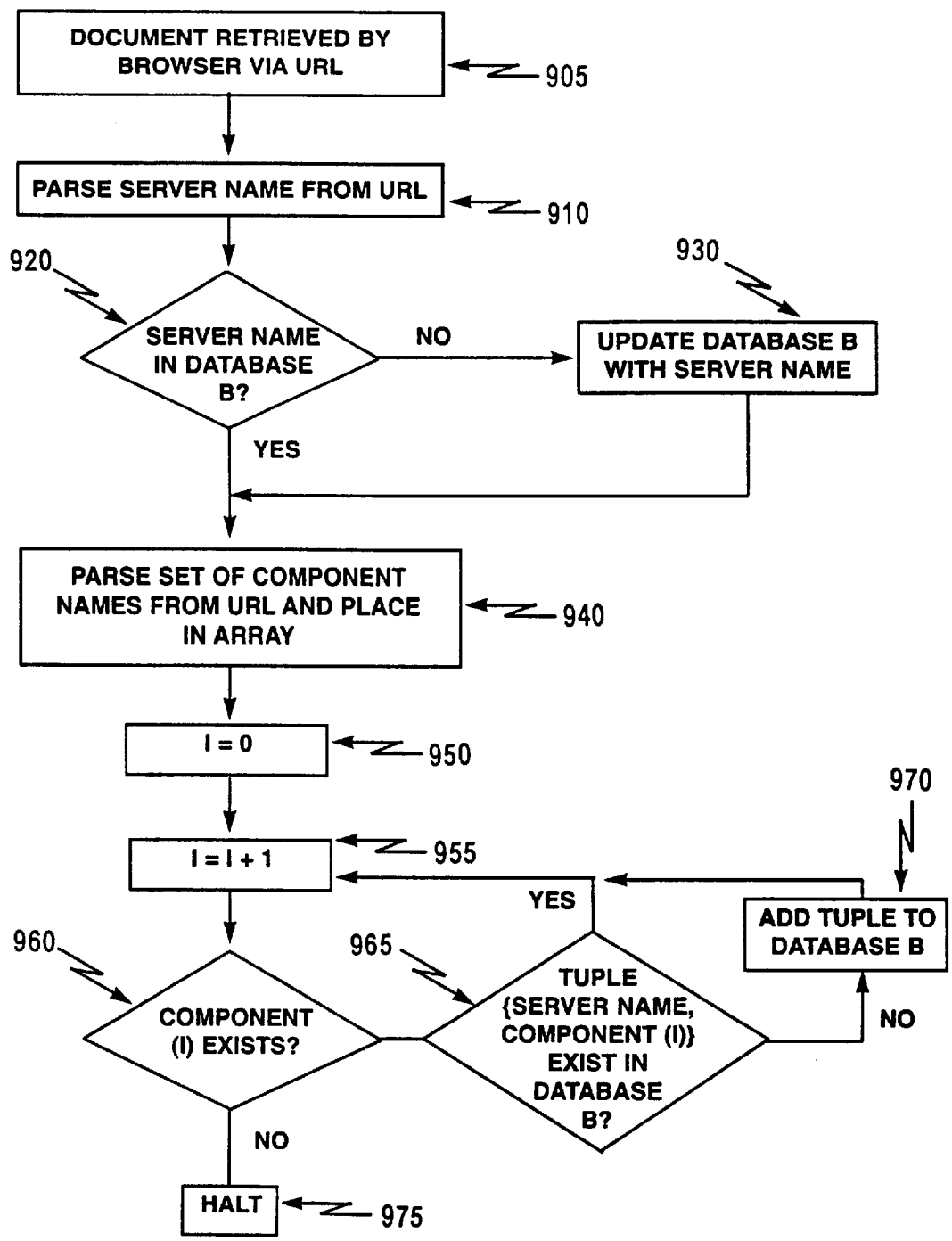
FIG. 9 is a flowchart of a process for updating the client-side databases.

FIG. 9 provides a process flowchart for the updating of the Databases B and C in the client-side component of the invention. A WWW document is retrieved by the browser via a URL, either supplied by the user or embedded in another document as a hypertext reference (905). The server name is parsed from the URL (910) and if the server name does not already reside in Database B (920) it is added to Database B (930). If the server name does currently exist in Database B (920) then the URL is parsed into components (excluding anything to the left of the server name and any CGI arguments) and placed into an array (940). Initializing the array subscript variable to zero (950) begins the process of adding tuples of the form (server name, component name) into Database C. The loop begins by incrementing the subscript variable by one (955). If the component in the array referenced by the subscript does exists (960, e.g., is not null) and the tuple does not already exist in Database C (965), then the tuple is added to Database C (970) and the process begins again at (955) by incrementing the subscript variable. If the component does already exist in Database C (965) then it is skipped and the process begins again at (955) by incrementing the subscript variable. Once the entire array of components has been exhausted (960) the process is terminated (975).

In order to conceptualize the actual experience the user would have employing the client-side component of the invention, the following example is helpful. Assume that Database C in FIG. 8 exists and that the user has entered the following URL into his browser:

http://www.sun.com/foot/ba/file~html

The protocol and domain server have been entered correctly, but a "Document Not Found" error occurs (FIG. 2, item 244) and so process control branches to FIG. 3, item 302. Since the user did manually enter the URL the spell checking process begins (FIG. 3, item 310) and control branches to FIG. 4 item 402 where an empty list of potential URLs is created. The first URL component is parsed from the URL and is "foot". There does exists at least one tuple in Database C which has a server name equal to that of the URL's, "www.sun.com". In this example the first tuple is {"www.sun.com", "foo"}. It is clear that a Phase I spell check will result in a match and the resulting constructed URL "http://www.sun.com/foo/ba/file~html" is place in the list of potentially valid URLs. Similarly, as the looping mechanism allow the processing of the second URL component, "ba", it is clear that a Phase II spell check will result in a match between "ba" and the tuple {"www.sun.com", "bar"} which will lead, in turn, to the creation of the URL "http://www.sun.com/foo/bar/file~html" which is placed in the list. Finally, again utilizing the looping mechanisms, it is found that the next component "file~html" can be successfully spell checked using Phase III, resulting in the creation of the URL "http://www.sun.com/foo/bar/file.html". The resulting list presented to the user would contain the following constructed URLs:

http://www.sun.com/foo/ba/file~html
http://www.sun.com/foo/bar/file~html
http://www.sun.com/foo/bar/file.html Although FIG. 8 item 830 makes it clear by inspection that the third and final URL on the list is the correct one, in actual practice the user would only be assured that the final URL has been the most thoroughly spell checked. But since the databases used to perform the spell check are, by their methods of construction, immediately out of date, it is not possible to say that the completely spell checked URL, which did exist in the past, still exists now. Nor can it be said that the first or second URLs on the list are necessarily invalid. In fact, the only positive assertion that can be made is that the URL initially entered by the user is invalid because an error message was received by the server stating that the document could not be found.

The method of spelling checking protocols and server names would operate in an analogous manner, utilizing the Phase I, II and III algorithms. While the actual parameters supplied would differ from the URL component spell check example, the transformations performed on String1 and String2 remain the same. It would be obvious to one skilled in the art how the spell checking already described would apply to protocol and server name spell checking.

Figure 10:
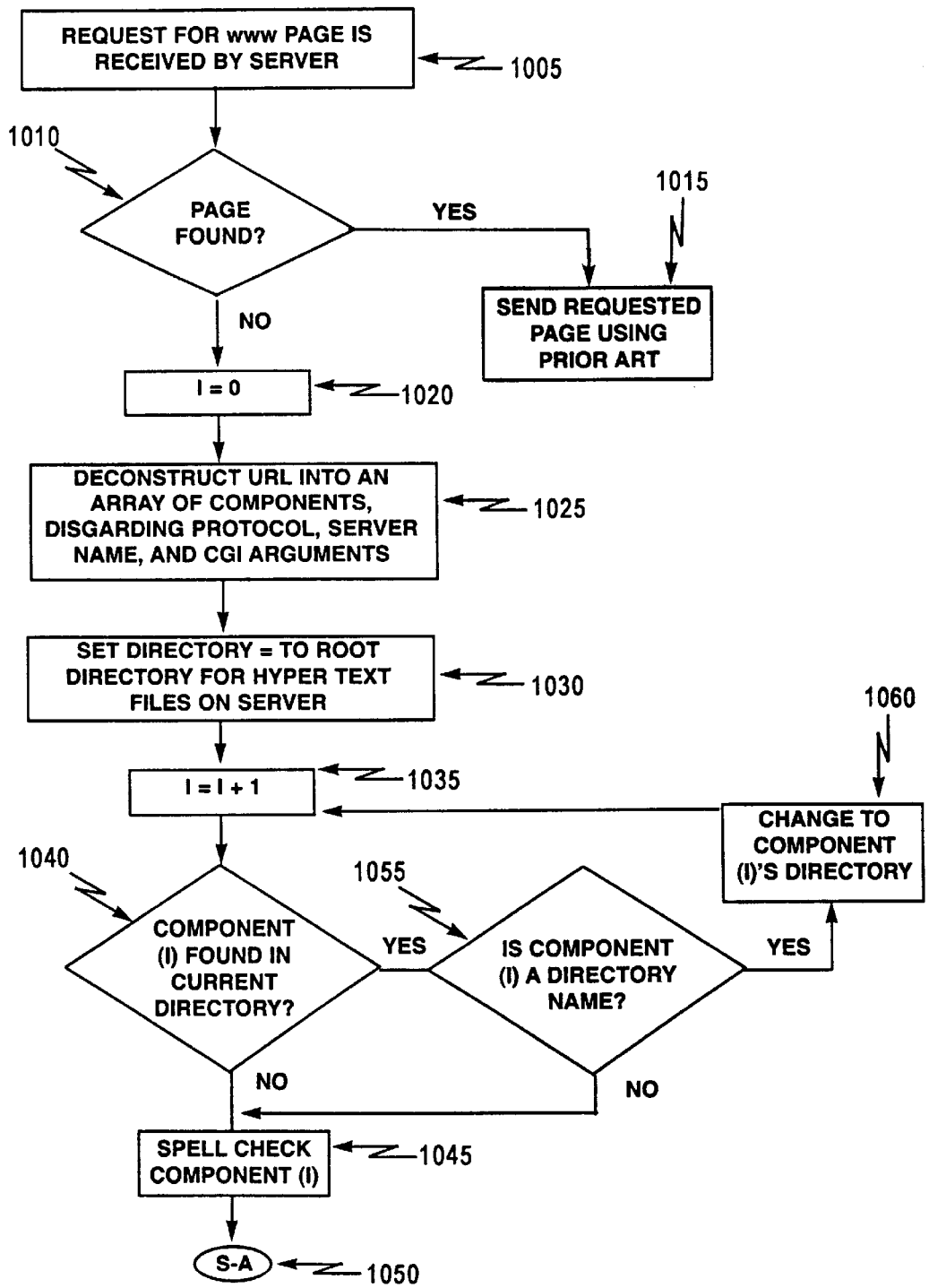
FIGS. 10 and 11 together are a flowchart for the server-side spelling checker component of the invention.
Figure 11:
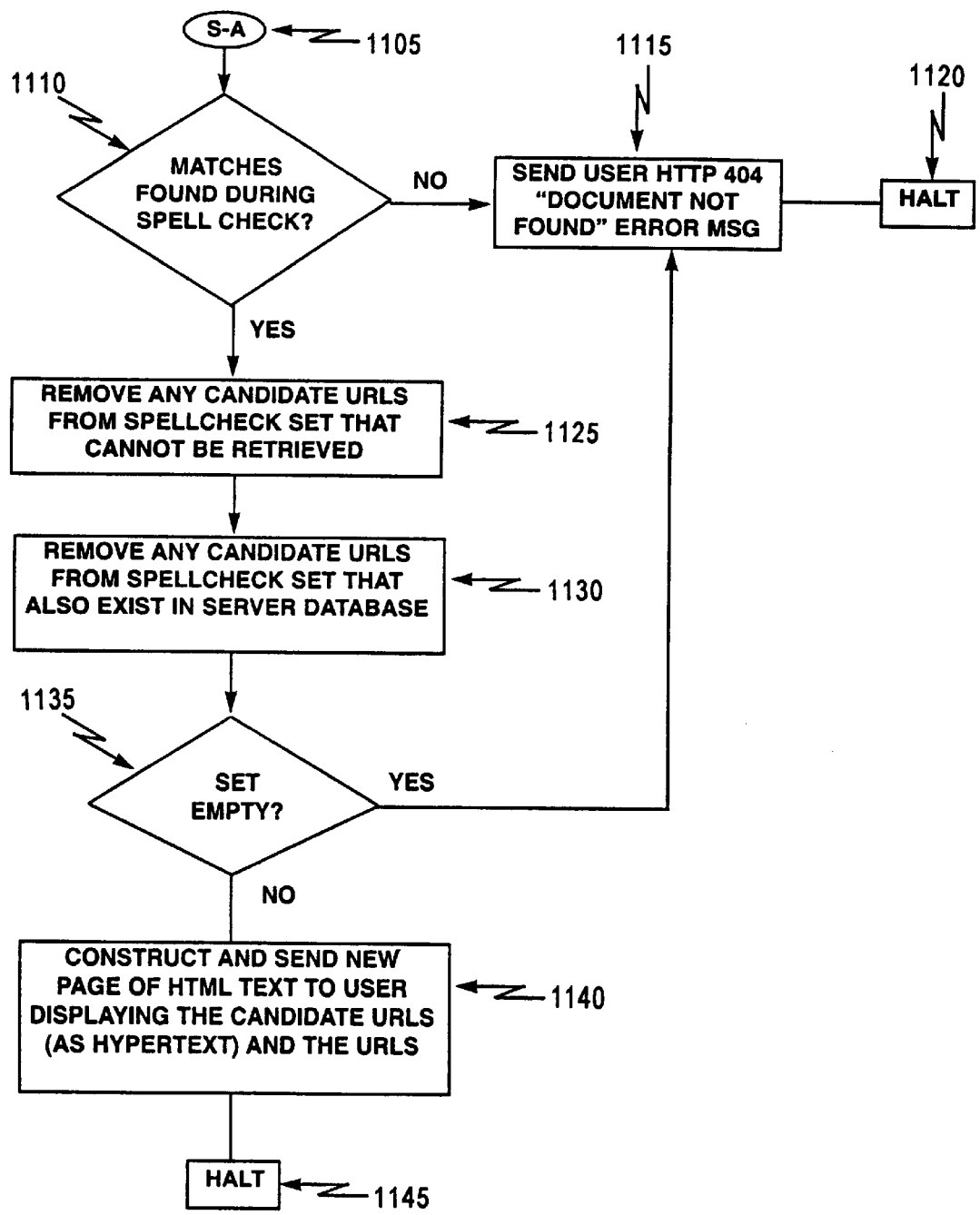

FIGS. 10 and 11 provide process flowcharts to describe a server-side spell checking component of the invention. The server-side spell checking embodiment uses the same conceptual approach as the client-side embodiment.

In FIG. 10, the process begins when a request for the WWW document or page is received by the server (1005). If the page is found on the server it is then sent to the requester using the prior art (1015). If it is not found on the server (1010) then the spell checking process starts by initializing an array subscript variable to zero (1020) and then deconstructing the URL into an array of components (1025). Since this is occurs at the server it may be safely assumed that the protocol and domain server names were correct and can therefore be ignored, along with any CGI arguments. Next the current directory is set to be the root directory for hypertext documents on the server (1030). After incrementing the array subscript (1035), the first component is compared to the entries in the directory (1040). If the component is found in the directory (1040) and the component is itself a directory name (1055) then the current directory is changed to be that of the component (1060) and the process begins again at 1035.

However, if the component is not found in the current directory (1040) then the component is spell checked using the same generic algorithm described above. The String1 argument would be the component itself, while the String2 values would be taken from the list of components found within the current directory one at a time. Following the connector S-A (1050) to it entry point in FIG. 11 (1105), if no matches were found during the spell check then the list of potential URLs is empty and the user is sent a "Document Not Found" error using the prior art (1115) and the process is terminated (1120). Alternatively, if matches were found, indicated by a non zero length list, the server-side component would test each URL on the list and remove those that could not be accessed (1125, i.e., those that returned "Document Not Found" errors). If the system administrator at the server-side maintains a simple list of "hidden" files, files that can only be accessed by entering the correct URL at the start, then the component will remove URLs from the spell checking list that occur in the "hidden" files list (1130). If after (1125 and 1130) the URL list is empty, the server-side component would send a "Document Not Found" error message to the user using the prior art (1115) and the process would terminate (1120). If, however, the list is not empty then the server would construct a new page, in HTML format, that would contain a note to the user indicating that the requested URL was not found but that instead the server had compiled a list of possible alternative URLs. The list of alternative URLs would be displayed in hypertext format with those components that had been replaced by the server-side spell checking embodiment displayed in a bold typeface as a visual aid to the user in determining what part of his original URL had been modified. Additionally, each suggested URL would be followed by the document title as a further selection aid for the user (1140).

The server-side creation of new WWW pages is well known in the art. For example, many search engines on the WWW return HTML pages to the user that contain hypertext links to other pages, with appropriate bolding or highlight of keywords (from the search terms) that appear in the page's title.

The collaborative (third) component of the invention performs sophisticated spell checking operations on a ISP's server or an organization's proxy server within a firewalled domain. For purposes of discussion these shall be referred to as "the service" The collaborative component is illustrated and described in FIGS. 12–15.

Figure 12:
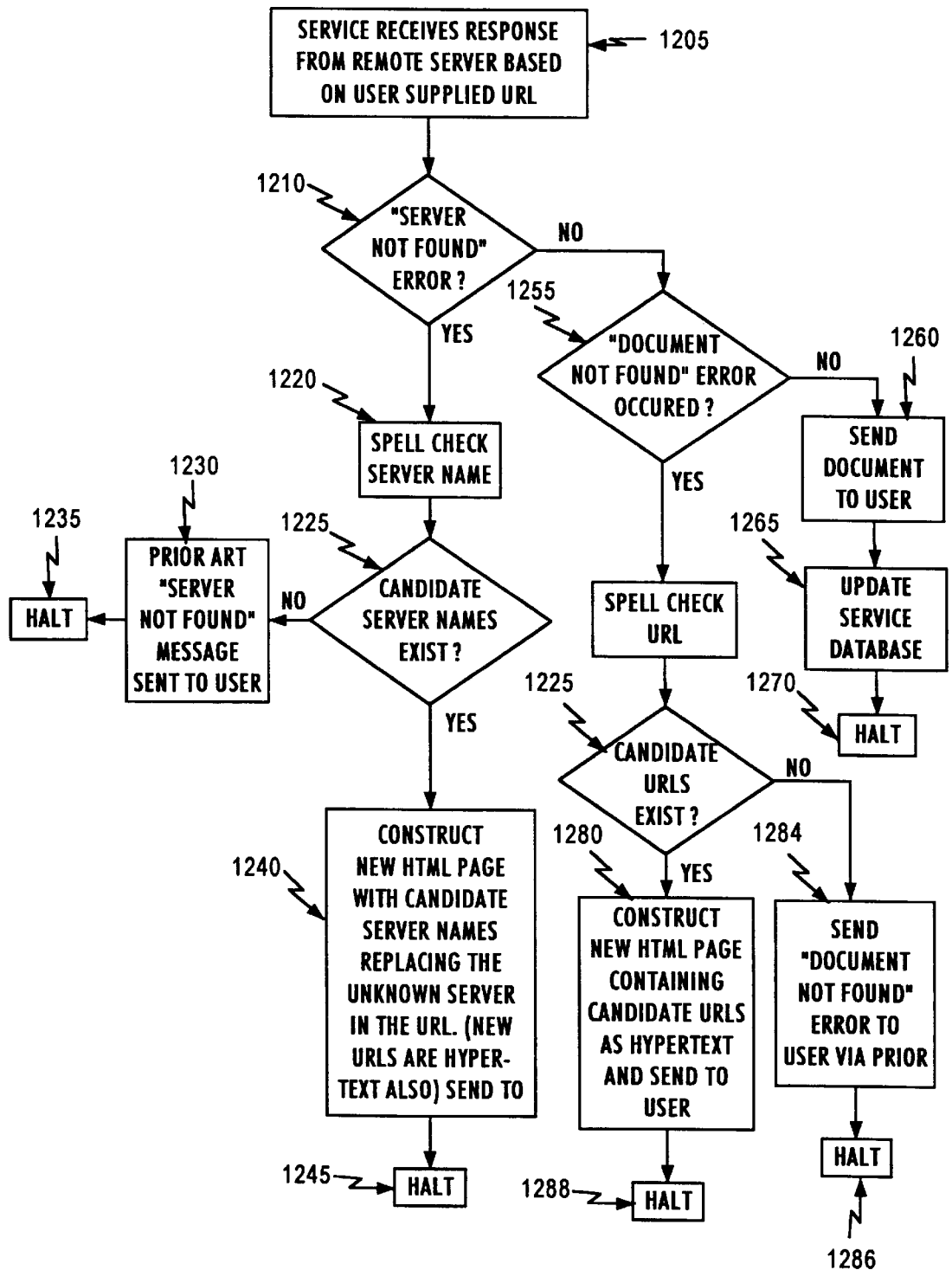
FIG. 12 is a flowchart for the use of the collaborative spell checker component of the invention.

FIG. 12 provides a process flowchart for the use of the collaborative spell checker component. The service receives an response from the remote server due to a request to retrieve a document using a URL sent by the user (1205). If the response received is the error "Server Not Found" then the server name is spell checked. If the server portion of the URL does not reside in Database A, which is maintained at the service's site, then the spell check algorithm described previously is employed to spell check the server name from the URL against server names in Database A (1220). That is, String1 would be the URL server name and String2 would be take on successive values from Database A until a match is found or there are no more database entries. If candidate server names are found during the spell check (1225) then the service would construct a new HTML page of candidate hypertext URLs, composed of the candidate server names and the components and CGI arguments to the left of the invalid server name in the original URL, which is then sent to the user (1240) and the process is terminated (1245). As with the server-side component, the collaborative component will encode the HTML page so that the new candidate server names are bolded or highlighted to provide a visual aid to the user. Additionally, a message would appear above the list to inform the user that the original server name was invalid. However, if no candidate server names are found (1225) then the error message "Server Not Found" is returned to the user's browser using the prior art (1230) and the process is terminated (1235).

Alternatively, if the service receives a "Document Not Found" error as a response from the remote server (1205), then the collaborative component will spell check the user-supplied URL. This is accomplished by using the service's Database B which contains all valid URLs that have been retrieved from remote servers and passed back to users via the service for some specified period of time. The generic spell check algorithm describe above can again be employed. But in this embodiment, the entire URL is checked as a single string. So, the variable String1 would contain the user supplied URL and String2 would be take on successive URL values from Database B, where the server name of the user-supplied URL is equal to the server name portion of the URL in Database B, until a match is found or there are no more database entries (1275). As with both the client-side and server-side components, a list a candidate URLs is created based upon the results of the spell check. If the list is empty then the "Document Not Found" error is passed on to the user via the prior art (1284) and the process is terminated (1286). If the list is not empty then the service would construct a new HTML page of candidate hypertext URLs, which is then sent to the user (1282) and the process is terminated (1288). As with the server-side component, the collaborative component will encode the HTML page so that the new candidate URLs are bolded or highlighted so provide a visual aid to the user. Additionally, a message would appear above the list to inform the user that the original URL was invalid.

Figure 13:
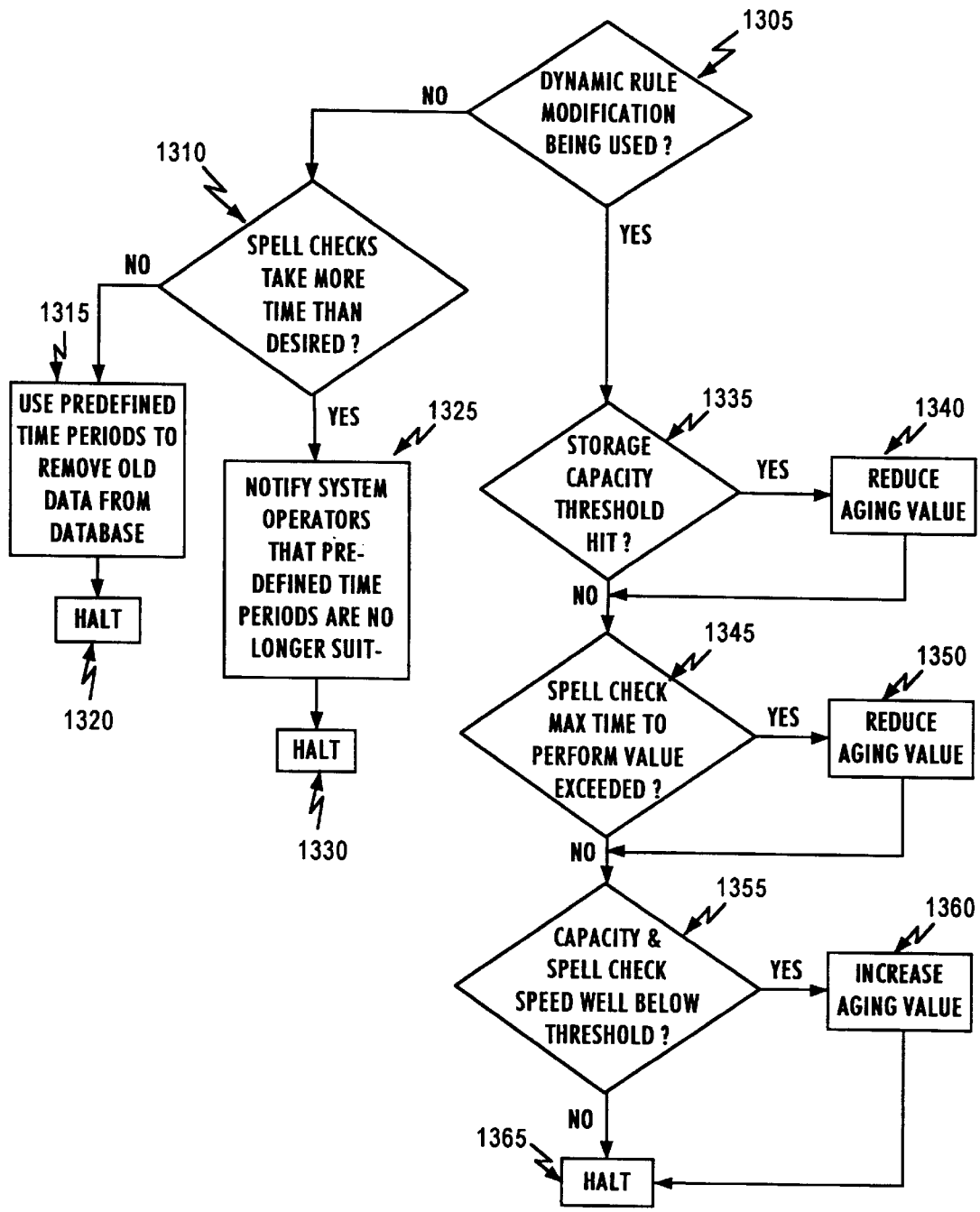
FIG. 13 is a flowchart of a process for dynamic and non-dynamic database pruning in the collaborative component of the invention.

Of course, as the service successfully retrieves WWW pages, its databases (see FIG. 14) will continue to grow. In order to control the growth of the databases, a pruning algorithm has been devised for pruning the databases. It is depicted in FIG. 13. The pruning occurs during low-load time for the service and is based upon defined aging parameters, which may be "hard coded" values that may not be changed by the pruning algorithm, or may be "seed values" that are dynamically changed during operations as conditions change. If dynamic rule modification is not being employed (1305) and if the spell checks are taking longer than the maximum time permitted (1310) the system operators are notified that the pre-defined time periods for holding database entries are no longer suitable (1325) and the process is terminated (1330). Alternatively, if the time to perform a spell check is less than the maximum time permitted (1310) then the system uses the pre-defined time periods to determine which database entries should be removed.

If dynamic rule modification is employed (1305) then if the storage capacity threshold has been met or exceeded (1335) then the aging values are reduced (1340) so that more older entries are removed. If storage capacity is still beneath the threshold (1335) but the time to perform a spell check has exceeded the maximum time allowed (1345) then, again, the aging values are reduced (1350). Alternatively, if the storage capacity is well below its threshold value and the time needed to perform spell checks is also significantly less than allowed (1355) then the aging values are increased (1360). If the storage capacity is below its threshold and the time needed to perform spell checks is less than allowed (but not significantly) then the process is terminated (1365). The flowchart, beginning at (1335) indicates that only if the thresholds are exceeded or if the system is operating substantially under those thresholds are the aging values changed; it is possible that none of the conditions are met for changing the aging values and the process simply terminates (1365).

FIG. 14 illustrates the databases required by the collaborative component of the invention. Database A contains previously valid server names and the dates they were last accessed (1405). Database B contains previously valid URLs for documents that have been successfully retrieved and the dates they were most recently retrieved (1420).

Figure 15:
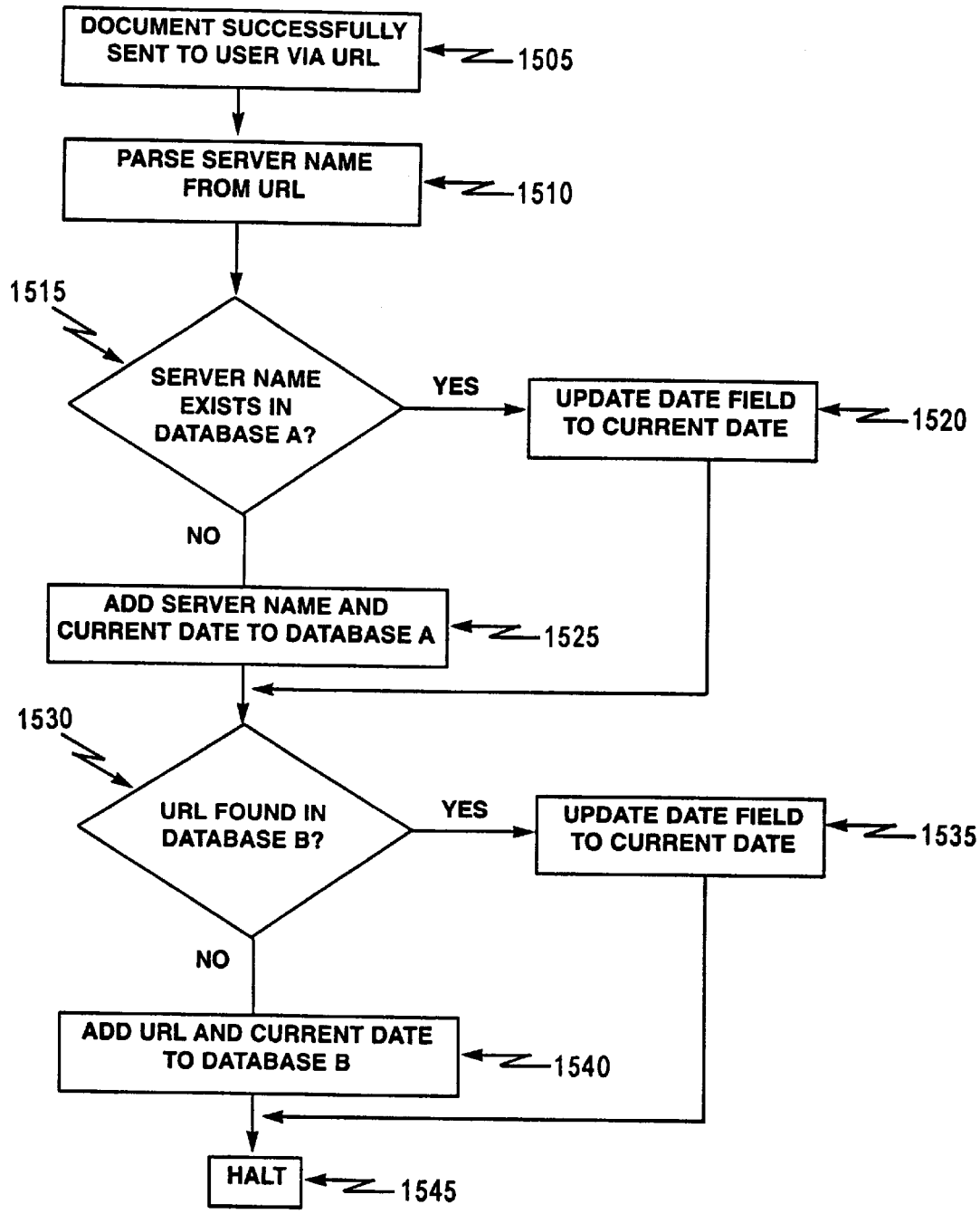
FIG. 15 is a flowchart of a process for updating the collaborative component's databases.

FIG. 15 provides a process flowchart for the updating of the collaborative component's databases. When a document is successfully retrieved from a remote server and sent to the user (1505) the server name is parsed from the URL (1510). If the server name exists in Database A (1515) then the date field in the database record corresponding to the server name is updated to the current date (1520). If the server name does not exist in Database A (1515) then the server name and the current date are added to the database (1525). If the URL is found in Database B (1530) then the date field in the database record corresponding to the URL is updated to the current date (1535) and the process is terminated (1545). If the URL does not exist in Database B (1530) then the URL and current date are added to the database (1540) and the process is terminated (1545).

Figure 16A:
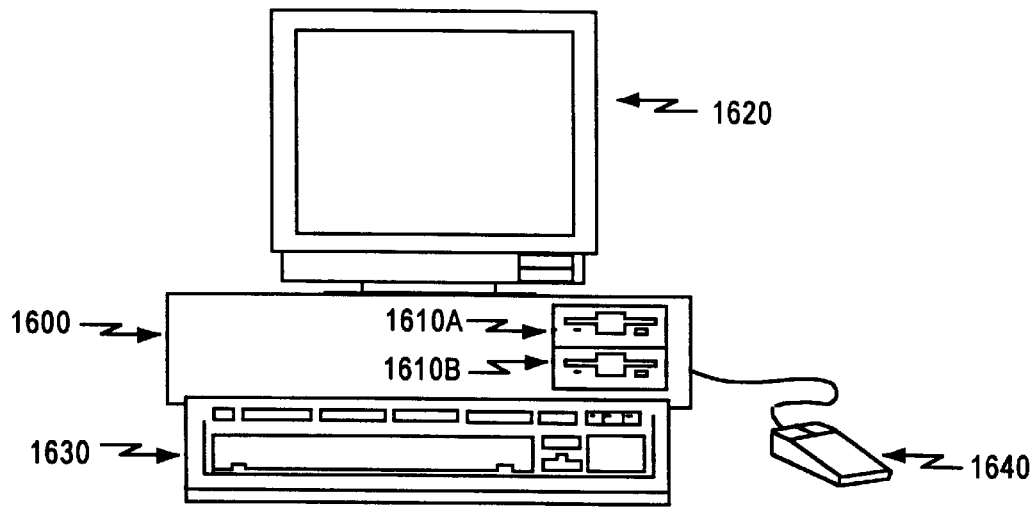
FIG. 16A illustrates a computer of a type suitable for carrying out the invention.

FIG. 16A illustrates a computer of a type suitable for carrying out the invention. Viewed externally in FIG. 16A, a computer system has a central processing unit 1600 having disk drives 1610A and 1610B. Disk drive indications 1610A and 1610B are merely symbolic of a number of disk drives which might be accommodated by the computer system. Typically, these would include a floppy disk drive such as 1610A, a hard disk drive (not shown externally) and a CD ROM drive indicated by slot 1610B. The number and type of drives varies, typically, with different computer configurations. The computer has the display 1620 upon which information is displayed. A keyboard 1630 and a mouse 1640 are typically also available as input devices. Preferably, the computer illustrated in FIG. 16A is a SPARC workstation from Sun Microsystems, Inc.

Figure 16B:
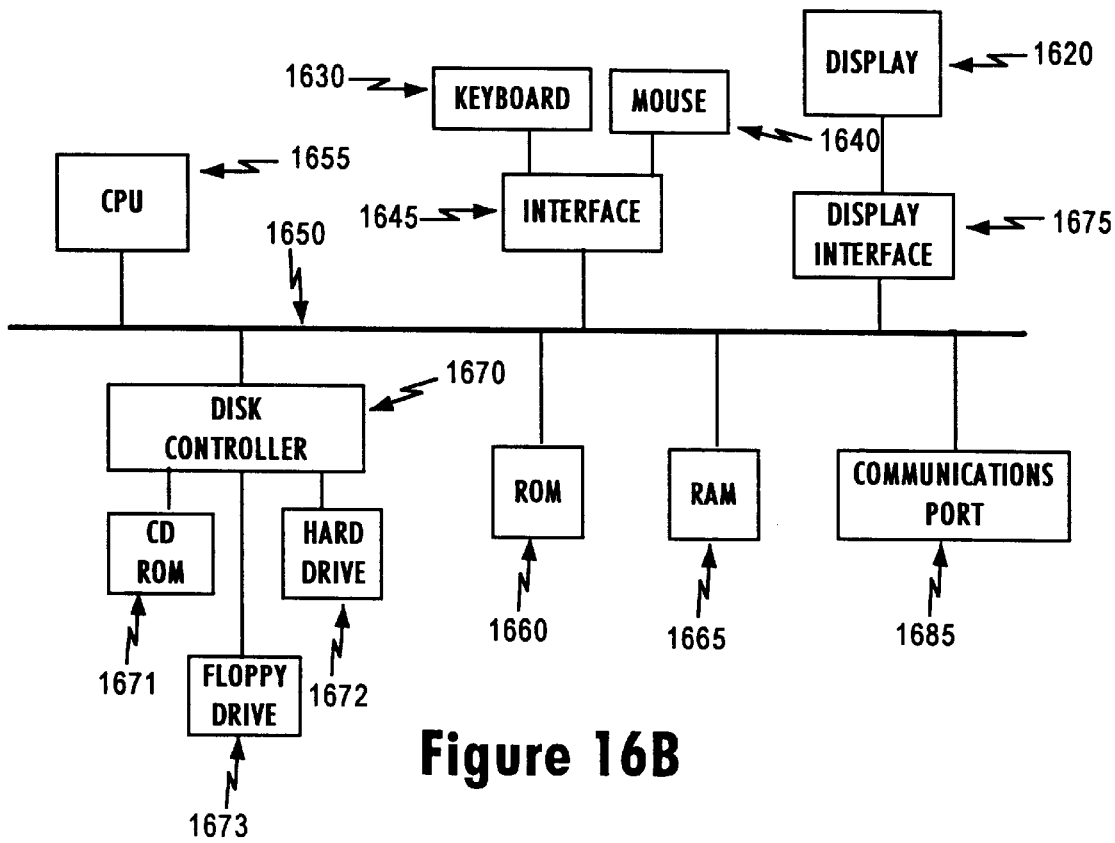
FIG. 16B illustrates a block diagram of the computer of FIG. 16A.

FIG. 16B illustrates a block diagram of the internal hardware of the computer of FIG. 16A. A bus 1650 serves as the main information highway interconnecting the other components of the computer. CPU 1655 is the central processing unit of the system, performing calculations and logic operations required to execute programs. Read only memory (1660) and random access memory (1665) constitute the main memory of the computer. Disk controller 1670 interfaces one or more disk drives to the system bus 1650. These disk drives may be floppy disk drives, such as 1673, internal or external hard drives, such as 1672, or CD ROM or DVD (Digital Video Disks) drives such as 1671. A display interface 1675 interfaces a display 1620 and permits information from the bus to be viewed on the display. Communications with external devices can occur over communications port 1685.

Figure 16C:
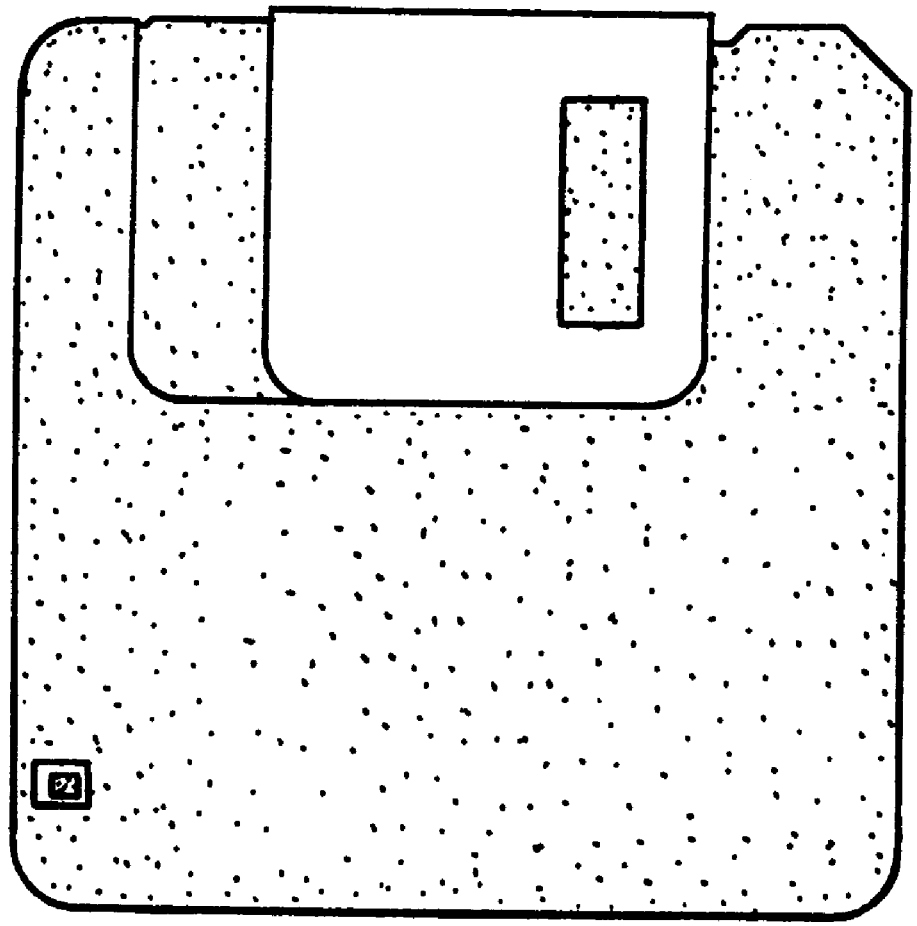
FIG. 16C illustrates an exemplary memory medium containing one or more programs usable with the computer of FIG. 16A.

FIG. 16C illustrates an exemplary memory medium which can be used with drives such as 1673 in FIG. 16B or 1610A in FIG. 16A. Typically, memory media such as a floppy disk, or a CD ROM, or a Digital Video Disk will contain, the program information for controlling the computer to enable the computer to perform its functions in accordance with the invention.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for checking spelling of network addresses, comprising:
   a. a first database containing valid network protocol names;
   b. a second database containing valid network server names;
   c. a third database containing valid component names; and
   d. a computer configured to analyze a network address, used in an attempt to establish a connection to that address but which did not result in a connection, to compare portions of that address with one of said first, second or third databases, containing corresponding information and present to a user one or more alternative spellings of that address if a portion of that address does not match identically a valid entry in the database.

2. Apparatus of claim 1 in which said one or more alternative spellings are presented in a form so that a user can select one of said alternative spellings with an input device and attempt to connect again using the selected alternative spelling.

3. Apparatus for checking spelling of network addresses received at a server having a hierarchical directory structure from a remote user, comprising:
   a. a database containing names of hidden files;
   b. and a computer configured to analyze network addresses term by term beyond the server address, to compare portions of an address with corresponding portions of the hierarchical directory and to present to said remote user one or more alternative spellings if a directory or file name does not match identically a valid entry in the hierarchical directory, unless such an alternative spelling is contained in said database.

4. Apparatus of claim 3 in which said one or more alternative spellings are presented in a form so that said remote user can select one of said alternative spellings with an input device and attempt to connect again using the selected alternative spelling.

5. Apparatus for checking spelling of network addresses received from a remote user at a network access provider, comprising:
   a. a database containing remote server names to which users have successfully connected;
   b. a database containing network addresses; and
   c. a computer configured to analyze a network addresses, received from a remote user which did not result in a connection, to compare portions of that address with portions of each database containing corresponding information and present to a user one or more alternative spellings if a portion of a network address does not identically match a valid entry in the databases.

6. Apparatus of claim 5 in which said one or more alternative spellings are presented in a form so that said remote user can select one of said alternative spellings with an input device and attempt to connect again using the selected alternative spelling.

7. A system for checking spelling of network addresses received from a user, comprising at least two computers connected to said network, said computers respectively running at least one of a client spell checker, a network access provider spell checker and a server spell checker resident on said respective computers.

8. A system for checking spelling of network addresses received from a user, comprising:
   a. a network; and
   b. a computer connected to said network configured to spell check network addresses and to suggest alternative spellings.

9. The system of claim 8 in which said computer is operated as a client in a client-server mode.

10. The system of claim 8 in which said computer is operated as a server in a client-server mode.

11. The system of claim 8 in which said computer is operated as a network access provider.

12. A method of checking spelling of network addresses, comprising the steps of:
   a. performing a step of comparing a portion of a network address received from a user which did not result in a connection with entries in a database containing corresponding portions of network addresses which had previously resulted in connections; and
   b. performing a step of identifying candidate matches from the database which match imperfectly a portion of a network address, and c. performing a step of when one or more candidate matches is found, providing a list of said candidate matches to said user.

13. The method of claim 12, in which candidate matches are provided to a user in a hypertext format which permits selection and use of one of said candidate matches in a connection request by clicking on a candidate match.

14. A method of checking spelling of network addresses in a server having a hierarchical directory, comprising the steps of:

a. performing a step of comparing a portion of a network address received from a remote user which did not result in access to a document on the server with corresponding portions of the hierarchical directory, and b. performing a step of presenting to said remote user alternative spellings if a directory or file name does not match identically a valid entry in the hierarchical directory.

15. The method of claim 14 in which the names of hidden files are excluded from the list of alternative spellings presented to a user.

16. A method of checking spelling of network addresses at a network access provider, comprising the steps of:

a. providing an element for performing the step of storing remote server names and network addresses, to which network access provider users have successfully connected, in one or more databases;

b. providing an element for performing the step of comparing portions of an address received from a network access provider user which did not result in a connection, with corresponding portions of said database; and c. providing an element for performing the step of presenting to said network access provider user alternative spellings if a portion of an address does not identically match a valid entry in the database.

17. A computer program product, comprising:

a. a memory medium; and b. a computer program stored on said memory medium, said computer program containing instructions for comparing a portion of a network address received from a user, which did not result in a connection, with entries in a database of network addresses, which previously resulted in a connection, to identify candidate matches which match imperfectly the network address received from the user, and when one or more candidate matches is found, providing a list of said candidate matches to said user.

18. A computer program product for checking spelling of network addresses in a server having a hierarchical directory, comprising:

a. a memory medium; and b. a computer program stored on said memory medium, said computer program containing instructions for comparing a portion of a network address received from a user which did not result in access to a document on the server with corresponding portions of the hierarchical directory and to present to a user alternative spellings if a directory or file name does not match identically a valid entry in the hierarchical directory.

19. A computer program product for checking spelling of network addresses in a server having a hierarchical directory, comprising:

a. a memory medium; and b. a computer program stored on said memory medium, said computer program containing instructions for storing remote server names and network addresses to which users have successfully connected in one or more databases, comparing portions of an address received from a user which did not result in a connection with corresponding portions of said database; and presenting to a user alternative spellings if a portion of an address does not match identically a valid entry in the database.

* * * * *